United States Patent [19]
Ma et al.

[11] Patent Number: 5,159,711
[45] Date of Patent: Oct. 27, 1992

[54] INTERFERENCE FILTER WITH HIGH DEGREE OF SELECTIVITY FOR TVRO RECEIVER SYSTEM

[75] Inventors: John Y. Ma, Milpitas, Calif.; Chung W. Cheong, Kowloon, Hong Kong

[73] Assignee: Astec International Limited, Kowloon, Hong Kong

[21] Appl. No.: 469,137

[22] Filed: Jan. 24, 1990

[51] Int. Cl.$^5$ ............................................... H04B 1/10
[52] U.S. Cl. .................................. 455/307; 333/176; 333/246; 455/266; 455/340
[58] Field of Search ............... 455/314, 316, 339, 340, 455/307, 266; 333/175, 176, 202, 213, 216, 234; 331/116 R

[56] References Cited

U.S. PATENT DOCUMENTS

| | | | |
|---|---|---|---|
| 4,254,382 | 3/1981 | Keller et al. | 331/116 R |
| 4,545,072 | 10/1985 | Skutta et al. | 455/183 |
| 4,551,856 | 11/1985 | Victor et al. | 455/183 |
| 4,571,560 | 2/1986 | Dobrovolny | 333/174 |
| 4,718,117 | 1/1988 | Ma et al. | 455/314 |
| 4,754,242 | 6/1988 | Okamura et al. | 333/175 |
| 4,761,825 | 8/1988 | Ma | 455/183 |
| 4,965,539 | 10/1990 | Korber, Jr. | 333/202 |

FOREIGN PATENT DOCUMENTS 0207015 9/1987 Japan .
0157501 6/1988 Japan .
0157502 6/1988 Japan .

OTHER PUBLICATIONS

Vizmuller, "An Absorptive Notch Filter", RF Featured Technology RF, Jul. 1988, pp. 31-35.

*Primary Examiner*—Reinhard J. Eisenzopf
*Assistant Examiner*—Chi H. Pham
*Attorney, Agent, or Firm*—Arnold, White & Durkee

[57] ABSTRACT

A TVRO receiver for receiving frequency-modulated video signals comprises a tuner including a superheterodyne circuit having a voltage-controlled oscillator (VCO), means for supplying a cotnrolling input voltage to the VCO, and a mixer for combining incoming 1st intermediate frequency (IF) sigals within a 1st predetermined IF frequency range with the output of the VCO to reduce the frequency of the 1st IF signals to generate 2nd IF signals within a 2nd predetermined IF frequency range, and a filter for selectively rejecting undersired interference signals. The interference filter comprises separate trap means for respectively blocking out interfering signals having selected bottom and top trap frequencies, tuning means for adjusting the bottom and top trap frequencies, means for increasing the quality factor of the trap means, and means for selectively switching the trap means into and out of the receiver based on the presence or absence of signals which interfere with the received signals.

8 Claims, 8 Drawing Sheets

INTERFERENCE FILTER WITH HIGH DEGREE OF SELECTIVITY FOR TVRO RECEIVER SYSTEM

BACKGROUND OF THE INVENTION

1. Field of the Invention

This invention relates generally to TVRO receivers for the reception of a wide range of satellite TV signals. More particularly, this invention relates to improved filtering means for reducing signal distortion resulting from interference signals, such as terrestrial interference (TI) and the like, in a TVRO receiver system.

2. Description of the Related Art

In TVRO systems, satellite signals are received by earth-station antennas and down-converted to a first intermediate frequency (IF) level at the antenna location. The conversion may involve the use of a down-converter for converting only a single channel of signals from the overall broadcast signals to the 1st IF frequency. More commonly, however, a block converter is used for converting all channels of a common polarity to the first IF block of frequencies. Typically, the first IF frequency block is spread across a bandwidth of about 600 to 800 MHz. within a frequency range of 950 to 1750 MHz. frequencies is subsequently relayed to the receiver via coaxial cable so that a particular channel may be selected for reception. During the reception process, the 1st IF signals are further down-converted to a second IF frequency range which traditionally has been centered at 70 MHz. in many TVRO systems.

A significant problem in the reception of satellite broadcast TV signals using conventional TVRO receivers is the signal distortion resulting from the presence of terrestrial interference (TI) signals. TI is generated by the presence of local terrestrial microwave communication links in the vicinity of earth-station reception equipment and can cause substantial degradation and even complete loss of broadcast signals being received from a satellite.

In the past, a variety of filters have been used within TVRO receivers to perform wave trapping of TI signals within the interference region. The use of TI filters for notching out destructive TI signals is effective and convenient at the conventionally used low 2nd IF frequencies of the order of tens of MHz. However, recent generation TVRO receivers are increasingly employing a higher second IF frequency of the order of hundreds of MHz. for a variety of reasons including the realization of VCO frequencies which are substantially alienated from the 1st IF frequency range in order to prevent interference between the VCO signals and the received signals.

At the present time, for instance, the use of a 2nd IF frequency of 480.5 MHz. is common within the United States, while a 2nd IF frequency of about 480 MHz. has virtually become the standard across Europe. At these higher 2nd IF frequencies, it is difficult to design traps or notch filters having the high Q factor and temperature and aging stability essential for effective elimination of TI and other related noise signals without inducing excessive attenuation of the received signals.

The rejection of interference signals with high sensitivity and selectivity is also important in a variety of other applications. In the design of high performance frequency synthesizers, for instance, spurious signals are generated by digital signals and surface as sidebands on the desired carrier. In such applications, it is important to have a filter which has a high quality factor and provides a narrow notch for accurately rejecting the interference signals.

SUMMARY OF THE INVENTION

It is a primary object of the present invention to provide a filter specifically suited to the rejection of high frequency interference signals with a high degree of selectivity.

A related object is to provide such a high frequency filter which has a substantially high Q factor and realizes a minimal amount of distortion of the signals processed therethrough.

Another object of this invention is to provide a filter of the above type which has a frequency response substantially independent of temperature drifts and aging factors.

A further object is to provide such a high frequency filter which can be manufactured at low cost and is particularly adapted for use in rejection of terrestrial interference signals in TVRO receivers employing a high 2nd IF frequency range.

Other objects and advantages of this invention will become apparent from studying the following detailed description in conjunction with the accompanying drawings.

Briefly, in accordance with the present invention, an improved interference filter is provided which is particularly suited for use in a TVRO receiver which is adapted to receiving frequency-modulated video signals and includes a tuner having a super heterodyne circuit using a voltage-controlled oscillator (VCO), means for supplying a controlling input voltage to the VCO, and a mixer for combining incoming 1st intermediate frequency (IF) signals within a first predetermined IF frequency range with the output of said VCO to reduce the frequency of the 1st IF signals to realize 2nd IF signals within a second predetermined IF frequency range. The improved interference filter is capable of selectively blocking out interference signals such as terrestrial interference (TI) signals and the like, and comprises 1st and 2nd trap means for respectively blocking out interference signals having a selected bottom trap frequency and a selected top trap frequency, tuning means for adjusting the top and bottom trap frequencies, means for increasing the quality factor of each of the 1st and 2nd trap means, and means for selectively switching the trap means into and out of the receiver based on whether or not the interference signals actually interfere with the received signals.

Each of the 1st and 2nd trap means essentially comprises a frequency resonant element, preferably a ceramic resonator, connected in series with a capacitive coupling element. Separate tuning means are provided for each of the trap means in the form of a variable capacitance element connected in parallel with the serial connection of the frequency resonant element and the capacitive coupling element. The variable capacitance element serves as a means for conveniently adjusting the trap frequencies in accordance with the frequency of the interfering signals.

The provision of the quality factor increasing means constitutes an important feature of this invention and functions as means for effectively increasing the attenuation level or "trap depth" with which the 1st and 2nd trap means respectively block out interfering signals at the bottom and top trap frequencies. According to a preferred embodiment, the quality factor increasing means is implemented in the form of a negative resistance active network adapted to offer a negative resistance to the resonant element in each of the trap means so as to effectively increase the quality factor thereof.

In accordance with another feature of this invention, the interference filter used in the TVRO receiver is also provided with a compensating power supply which feeds the quality factor increasing means and is adapted to adjust the negative resistance offered by the active network so as to controllably counteract any variation of the negative resistance due to temperature fluctuations and aging drifts. Accordingly, the compensating power supply functions as means for stabilizing the quality factor and, hence, the trap depth and TI rejection efficiency of the 1st and 2nd trap means.

Each of the 1st and 2nd trap means is made selectively switchable into and out of the circuit. Accordingly, the interference traps can be switched into the receiver circuit only when interfering signals are found to be present and substantially interfering with the received signals. Distortion of the received signals when the interference filter is switched in is reduced by the use of capacitive coupling for the bottom frequency trap and combined coupling for the top frequency trap. Preferably, the active network in the quality factor increasing means is biased in such a way as to offer negative resistance to the resonant element in the traps without causing circuit oscillations.

DESCRIPTION OF THE PREFERRED EMBODIMENTS

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 1:
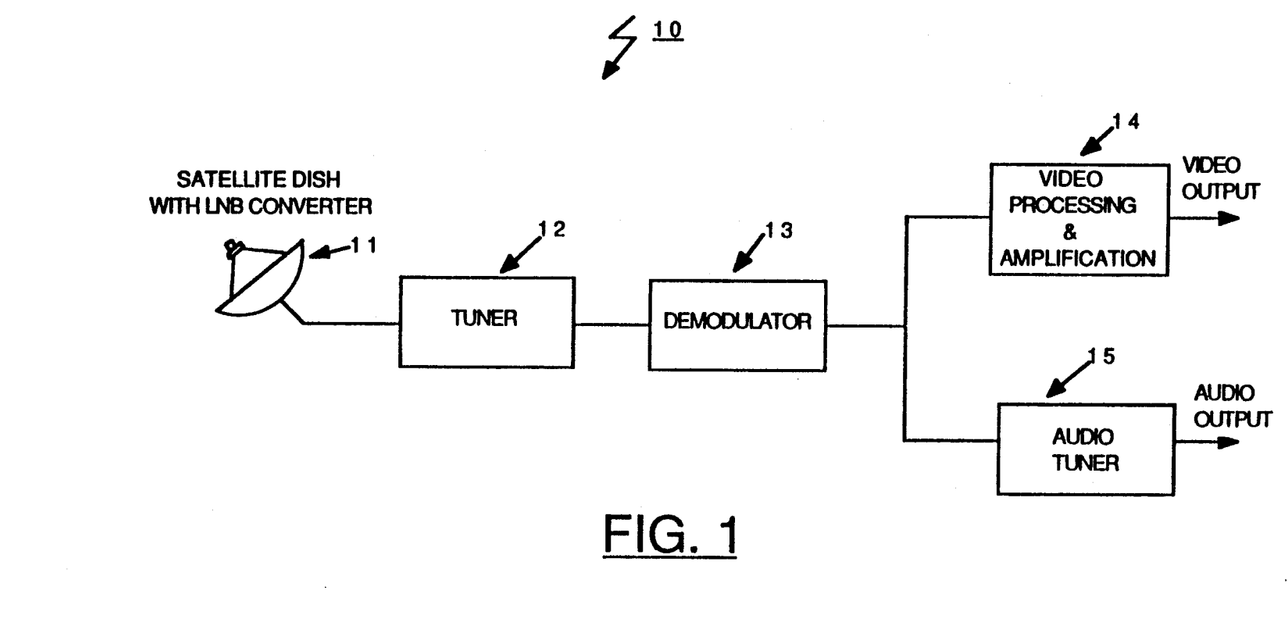
FIG. 1 is a simplified block diagram of a convention earth station system.

Referring now to the drawings, there is shown in FIG. 1 a functional block diagram of a TVRO earth station system for the reception of frequency modulated signals typically broadcast by satellite. The TVRO system 10 includes a satellite antenna 11, which is typically a paraboloidal dish equipped with a low noise block (LNB) converter and related accessories and positioning mechanisms, for capturing signals transmitted from orbiting satellites. Signals received by the satellite are relayed to a receiver system which includes a tuner 12, a demodulator 13, a video processing and amplification section 14 the output of which constitutes the received video signals, and an audio tuner 15 the output of which constitutes the received audio signals.

The signals broadcast via satellite and captured by the antenna 11 are typically in the 4-GHz frequency band. Subsequently, the entire block of received frequencies is converted to a 1st IF frequency range of about 950 to 1750 MHz. by the LNB converter located at the earth station site. The 1st IF signals are then sent over coaxial cable to the tuner 12 where a particular channel is selected for viewing following the conversion of the signals in that particular channel to a 2nd IF frequency range. Preferably, the 2nd IF frequency range is high enough to permit the 2nd IF VCO frequencies to be substantially non-interfering with the received signals. For a 1st IF frequency range of 950 to 1750 MHz., it becomes necessary to employ a center frequency for the 2nd IF frequency range which is about 500 MHz. A particularly preferred 2nd IF center frequency based on European TVRO standards is 479.5 MHz.

In the system of FIG. 1, the demodulator 13 processes the 2nd IF signals by passing them through an amplifier and a filter on to a conventional video detector where the frequency-modulated signals are demodulated to the base band of the original video signals, thereby producing a composite video signal output. Preferably, the pass band of the filter is selected to have a narrow width so that only the essential video and audio information passes through whereas unwanted noise received on the edges of the selected channel is rejected. The output of the demodulator 13 essentially comprises the base band signals including the transmitted video information and subcarriers.

Figure 2:
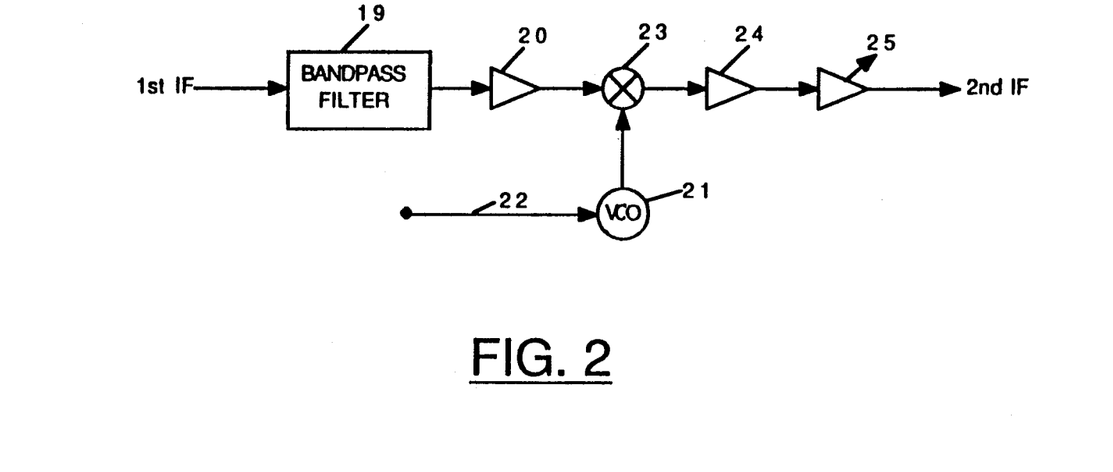
FIG. 2 is a block diagram of a conventional tuner for the TVRO system shown in FIG. 1.

Referring now to FIG. 2, there is shown a simplified block diagram of a tuner 12 adapted for use with the TVRO system of FIG. 1. The tuner 12 includes a band pass filter 19 which has a pass band that is about 800 MHz. wide so that signals spread across the 1st IF range of 950 to 1750 MHz. are allowed to pass therethrough. Subsequently, the 1st IF signals are fed through a pre-amplifier 20 to a super-heterodyne circuit which includes a voltage-controlled oscillator (VCO) 21 which feeds a mixer 23 for combining the VCO output with the 1st IF output of the amplifier 20, thereby converting the 1st IF signals to within a desired 2nd IF frequency range. The frequency of the VCO output is regulated by a controlling input voltage on line 22. The 2nd IF signals generated at the output of mixer 23 are subjected to a desired level of amplification by a pair of amplifiers 24 and 25 before becoming available for processing by the demodulator 13.

The receiver system essentially operates by adjusting the controlling input voltage supplied to the VCO 21 on line 22 in such a way that different channels or frequency bands within the 1st IF range of signals are centered on the center frequency of the 2nd IF output of the mixer 23.

Figure 3:
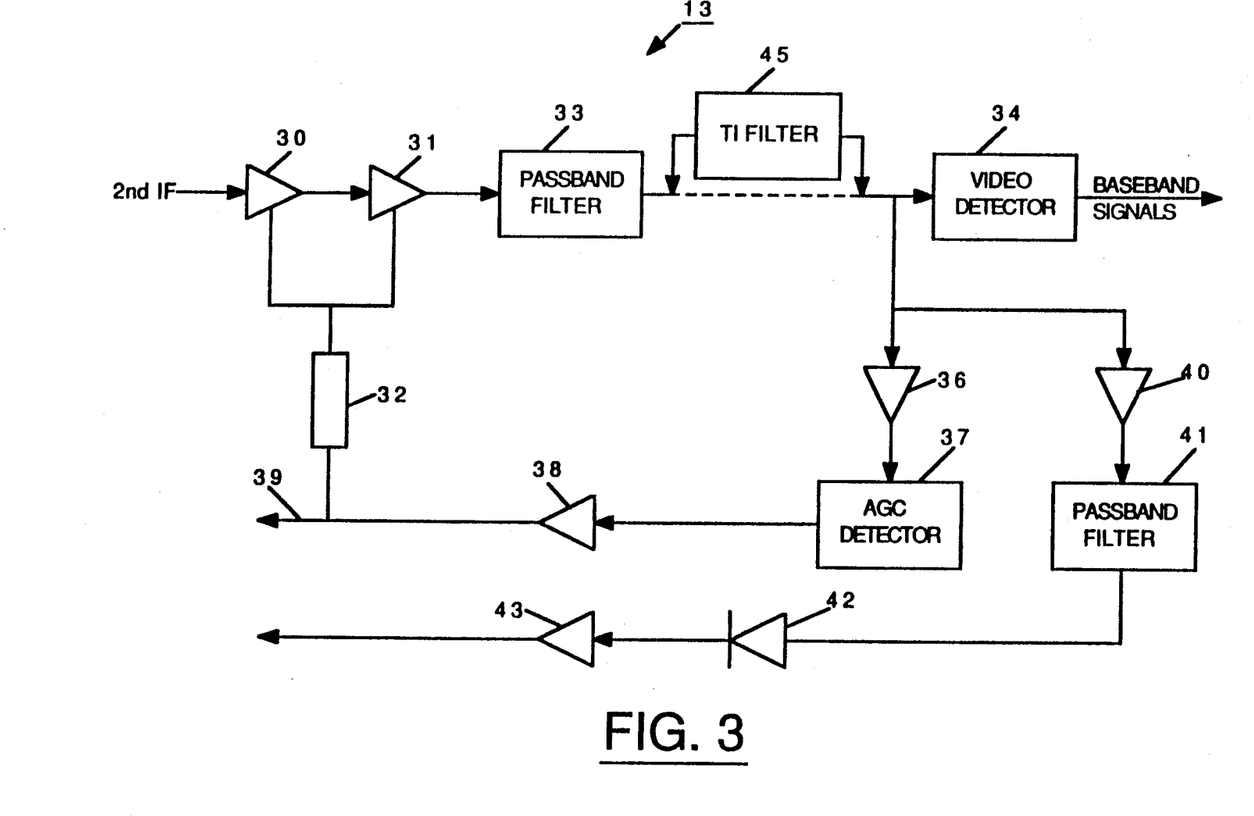
FIG. 3 is a block diagram of a demodulator adapted for use with the TVRO system of FIG. 1.

Referring now to FIG. 3, there is shown a block diagram of a preferred demodulator 13 for processing the 2nd IF output signals generated by the tuner 12 in the TVRO system of FIG. 1. The demodulator circuit 13 includes a pair of standard IF amplifiers 30 and 31 for amplifying the received IF signals in accordance with an automatic gain control (AGC) signal received at an input terminal 32. After this amplification stage, the 2nd IF signals are passed through a band pass filter 33 and onto a conventional video detector 34 which generates a composite video output signal by demodulating the frequency-modulated signals to the base band of the original video signal. The 2nd IF filter 33 preferably has a narrow pass band about 20-22 MHz. wide so that only the essential video and audio information is passed.

In the demodulator 13, the AGC feedback loop includes an IF amplifier 36 where the filtered 2nd IF signals are amplified and subsequently supplied to an AGC detector 37. The detected AGC output is processed by an amplifier 38 which produces a signal on line 39 which is indicative of the strength of the AGC signal. This signal is used to drive a signal strength meter (not shown) generally located on the front panel of the TVRO receiver.

The illustrative demodulator 13 also includes an IF amplifier 40 which amplifies the filtered 2nd IF signals before passing them to a narrow pass band filter 41. The filtered output from filter 41 is subsequently passed through a detector in the form of a standard diode 42 and then an amplifier 43 to produce a DC output voltage that can be used to detect the presence of a signal near the center frequency of the particular satellite channel to which the receiver is tuned.

The output of the video detector 34 in FIG. 3 constitutes the demodulator output and comprises the base band signals including video information and subcarriers. The video information segment of the base band signals is processed by the video processing and amplification section 14 of FIG. 1 before being displayed on a video monitor or television set. The audio signals are processed by the audio tuner 15 of FIG. 1 and subsequently relayed to one or more speakers to generate audible sound.

The pass band filter 33 is preferably a linear phase pass band filter having a "haystack" filter response which, because of its sharply sloping band edges, rejects a major portion of the TI and other noise signals at both edges of the received video signal spectrum. A preferred implementation of such a TI filter is discussed in detail in Ma, et al., U.S. Pat. No. 4,718,117, which is also owned by the assignee of the present invention.

While a haystack filter of this type can be used to effectively filter out a substantial portion of interfering signals, it is desireable to achieve a substantially higher degree of rejection and, particularly, to realize an increased level of signal attenuation or "trap depth" at the edges of the pass band. It is also important that the frequency rejection characteristics of the filter be made independent of variations which invariably result from temperature fluctuation and component aging factors. At the same time, it is desirable to achieve such a high degree of rejection without substantially distorting the received signals.

In accordance with the present invention, the above objectives are realized by the provision of a low-cost, high-Q interference filter which has temperature compensated trap characteristics and is capable of conveniently being switched into a receiver circuit, such as the TVRO demodulator described above, only when interference exists between undesired signals and the received video signals.

Figure 4:
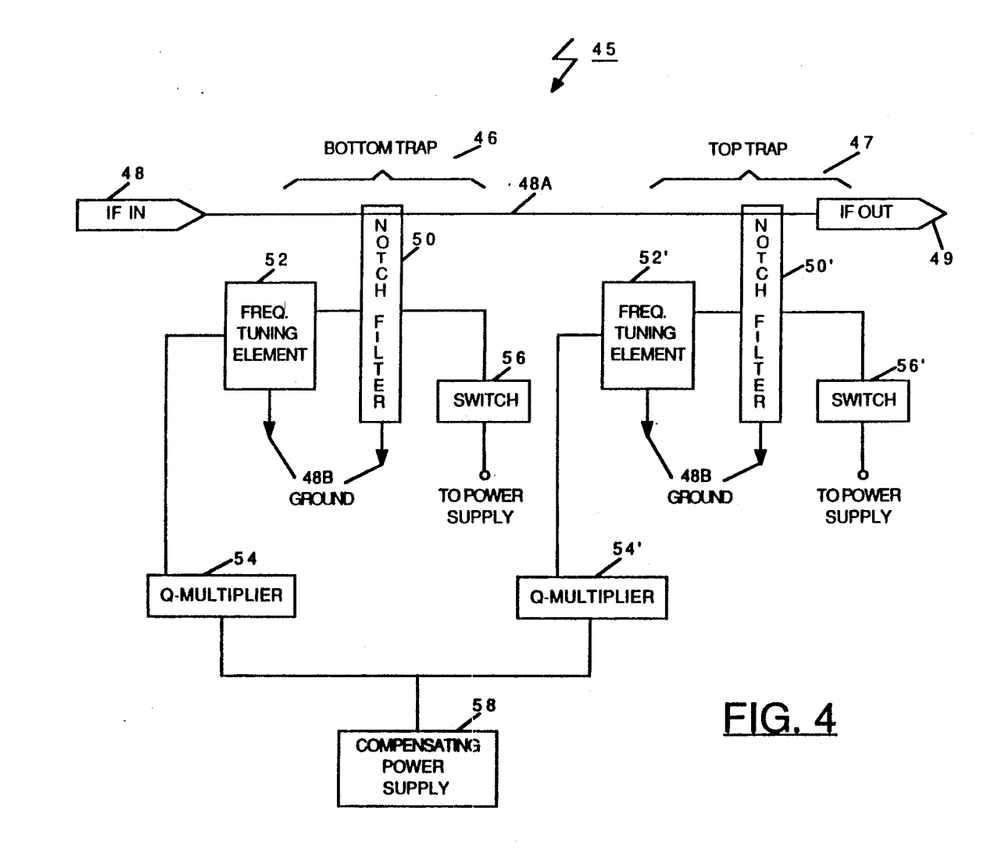
FIG. 4 is a schematic block diagram of a preferred embodiment of an improved interference filter suited for use in rejecting TI signals in a TVRO system of the type shown in FIG. 1.

Referring now to FIG. 4, there is shown a schematic diagram of an exemplary interference filter 45 for use in accordance with the system of this invention. The filter 45 essentially comprises a bottom trap section 46 and a top trap section 47 connected in parallel across a length of signal transmission line 48A and a reference ground plane 48B. The signal transmission line 48A may, for instance, be a strip transmission line of the conventional 50-ohm type having its ends connected to the reference ground plane. Incoming IF signals 48 enter the filter 45 at the bottom trap section 46 and filtered outgoing IF signals 49 exit out of the filter 45 from the top trap section 47.

The trap section 46 essentially comprises a notch filter 50 which is linked to a switch 56 leading to a standard power supply (not shown) which regulates the operation of this switch. The switch effectively functions as means for switching the bottom trap section 46 of the filter 45 into or out of the receiver circuit. The top trap section 47 is similar to the bottom trap section 46 and comprises a notch filter 50' linked to a switch 56'. The function of the bottom trap section 46 and, more particularly, the notch filter 50, is to trap or remove interfering signals having the unwanted bottom frequency. The top trap section 47 has a similar action; however, this section functions to remove interfering signals corresponding to the unwanted top frequency.

Even though each of the trap sections is designed to achieve a selected trap frequency, standard manufacturing tolerances result in some fluctuation of the actual trap frequency realized following fabrication of the overall filter. Accordingly, it is desirable that some means be provided for adjusting the trap frequency by the small extent usually necessary for aligning the actual frequency with the desired design frequency. This post-fabrication alignment of the trap frequencies of the notch filters 50 and 50' is made possible by the provision of frequency tuning elements 52 and 52' respectively associated therewith.

While the trap frequencies may be directly aligned by varying the inductance elements within the notch filters themselves, the process is generally cumbersome and time consuming. The provision of tuning elements separate from the notch filter allows the trap frequency thereof to be conveniently and accurately tuned with the sensitivity needed for post-fabrication alignment. Preferably, the tuning element is in the form of a large inductance coil connected in parallel with the resonant element included in the associated notch filter. The trap frequency of the filter can then be easily aligned by physically compressing or relaxing the turns forming the inductance coil.

Figure 6:
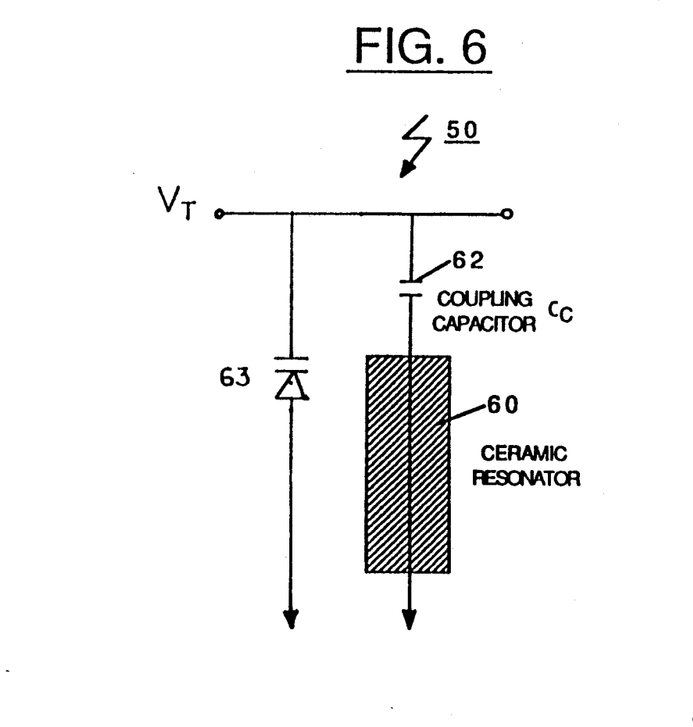
FIG. 6 is a schematic diagram of a preferred trap means for use with the interference filter of FIG. 4.

According to a preferred embodiment, as illustrated in FIG. 6, the notch filters 50 and 50' for the two trap sections each comprise a coupling capacitor $c_c$ (designated as 62) which is connected on one end to the signal transmission line (48A in FIG. 4) where incoming IF signals are received and on the other end to a ceramic resonator 60 leading to the reference ground plane. As described above, the tuning element 52 for the notch filter 50 is connected in parallel across the ceramic resonator 60. Conventional resonance analysis principles can be applied to select the component values for the coupling capacitor $c_c$, the ceramic resonator 60 and the tuning inductance coil forming the tuning element 52, on the basis of the desired top and bottom trap frequencies. Subsequent to fabrication, any required frequency alignment can be performed by physically adjusting the inductance coil.

The bottom trap section 46 and the top trap section 47. in combination, provide the desired rejection of interfering signals having given bottom and top trap frequencies relative to a pre-selected center frequency or resonance frequency for the overall interference filter 45 defined by the two trap sections.

In order to render the trap frequencies of the top and bottom trap sections 47 and 46 tunable during use of the filter, each of the notch filters 50 and 50' is provided with a variable capacitance element 63 connected in parallel across the serial connection of the coupling capacitor 62 and the ceramic resonator 60. The element 63 can be a standard varicap diode, the capacitance of which is variable on the basis of a tuning voltage $V_T$ applied thereto. Thus, the tuning voltage $V_T$ can be adjusted to vary the capacitance of the element 63 so that the overall capacitance of the resonant circuit for the notch filter and, hence, the associated trap frequency is correspondingly varied. Thus, the top and bottom trap frequencies of the filter 45 section can easily be adjusted in accordance with the frequency range of interfering signals encountered during the reception process.

Figure 5:
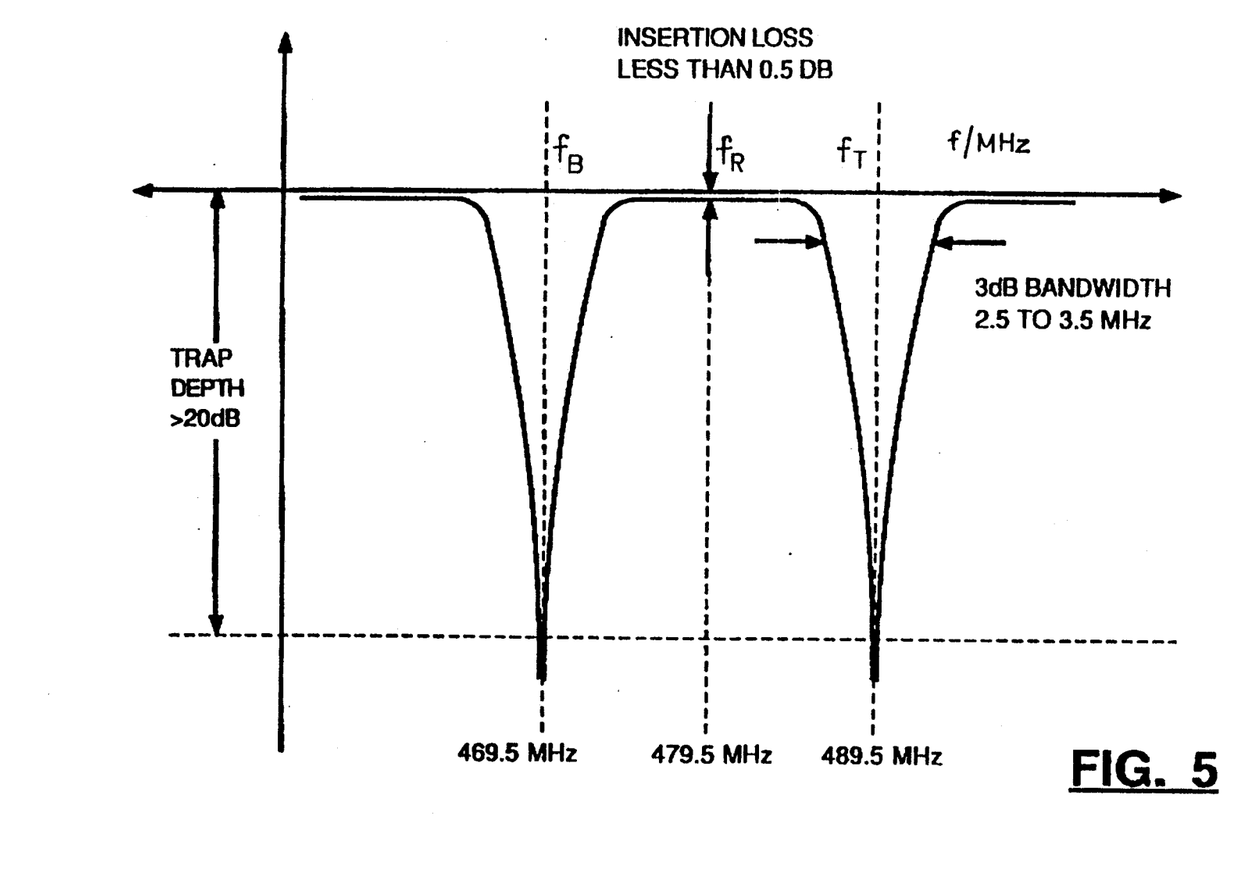
FIG. 5 is a graphical representation of an exemplary characteristic response of the filter shown in FIG. 4.

An exemplary characteristic response of an interference filter of the above-described type is illustrated in graphical form in FIG. 5. As shown therein, the overall pass band of the filter is centered at a resonance frequency $f_R$ which is selected to correspond to the 2nd IF frequency generated within the receiver system. The two trap sections 46 and 47 are preferably designed to realize top and bottom trap frequencies $f_T$ and $f_B$, respectively, which are symmetrically disposed about the resonance frequency $f_R$.

According to a preferred embodiment, the 2nd IF frequency is selected to correspond to the standard 479.5 MHz. frequency required according to European standards. The bottom trap frequency $f_B$ is selected to be centered at 469.5 MHz. while the top frequency $f_T$ is selected to be centered at 489.5 MHz. Preferably, the insertion loss resulting from the TI filter being switched into the receiver circuit is restricted to about 0.5 dBs and the filter arrangement according to the preferred embodiment satisfies this guideline.

An important aspect of the characteristic response shown at FIG. 5 for the TI filter is the −3 dB bandwidth which serves as a measure of the selectivity with Which undesired signals centered about either the top or bottom trap frequencies are rejected—the larger the −3 dB bandwidth, the higher the extent to which desired video signals are attenuated in addition to the undesired TI signals centered about the top or bottom trap frequencies. It is preferable that the −3 dB bandwidth of both the top and bottom trap sections be restricted to 3 MHz. It should be noted that the −3 dB bandwidth is proportional to the values of the coupling capacitor $c_c$ and the quality factor Q of the ceramic resonator. The trap frequency for each of the traps is slightly below the corresponding fundamental resonant frequency and can be varied in correspondence with the capacitance of the coupling capacitor. The separate tuning element provides an extremely convenient avenue for adjusting the resonance frequency of each notch filter and, accordingly, the corresponding trap frequency.

In the response characteristics shown in FIG. 5, the extent to which signals centered at the top and bottom trap frequencies are rejected also constitutes an important characteristic and is defined by the trap depth T dBs at the critical frequencies. The trap depth T is proportional to the amount of coupling within each notch filter and the quality factor Q of the resonator.

According to a specific embodiment of the interference filter for approximating the response characteristics shown in FIG. 5, a 5 mm ceramic resonator having a quality factor Q equal to 350 is used. The requisite amount of coupling is realized by using a coupling capacitor having a capacitance $c_c$ equal to 1.5 pf. With this arrangement, the trap depth T is about 10 dB and the −3 dB bandwidth is about 4 MHz. The resulting trap characteristics are found to be insufficient for realizing the requisite extent and accuracy of rejection at the top and bottom trap frequencies. It, thus, becomes necessary to increase the quality factor Q of the resonator in order to reduce the −3 dB bandwidth and increase the trap depth T to desired levels.

According to a feature of this invention, this increase in quality factor of the resonant circuit for each notch filter is realized by the provision of Q-multiplier circuits 54 and 54' respectively associated with the notch filters 50 and 50' of the two trap sections. More specifically, as shown in FIG. 7, each Q-multiplier circuit is in the form of a negative resistance active network which offers a negative resistance at the point where it is connected to the resonator.

Figure 7:
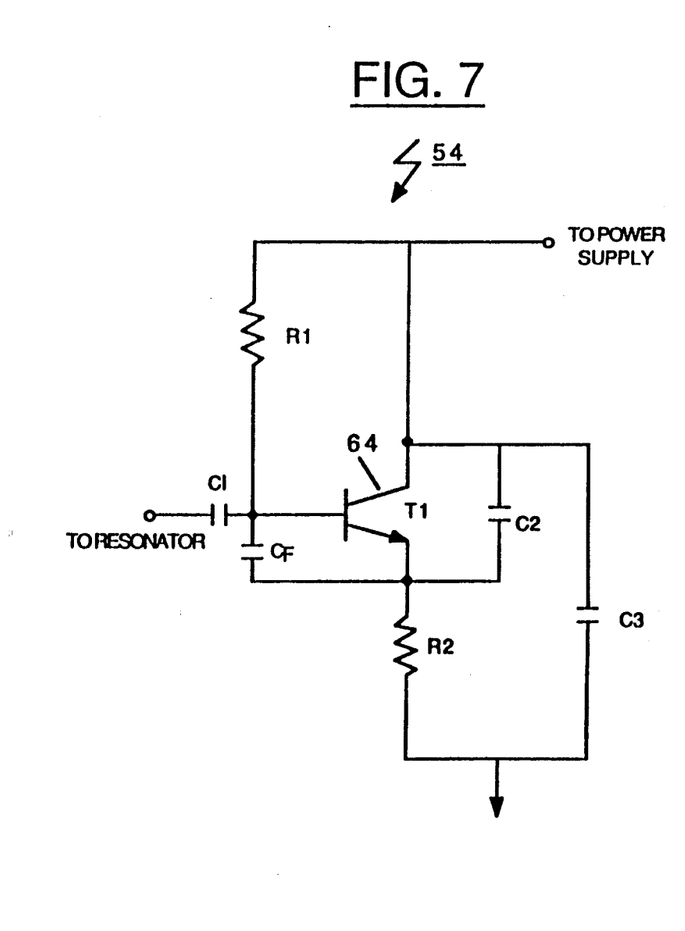
FIG. 7 is a schematic diagram of a preferred embodiment of the Q-multiplier means of FIG. 4.

As shown in FIG. 7, the negative resistance network comprises a transistor T1 (designated as 64) the base of which is connected through an isolating capacitor C1 to the resonator. The emitter of transistor T1 is coupled to its base through a capacitor $C_F$, to its collector by a capacitor C2 and to ground by a resistance R2. The network is powered by a power supply (not shown) which positively feeds the collector of the transistor T1 directly and the transistor base through a resistance R1. The collector of the transistor T1 is also coupled to ground through a capacitance C3.

The above-described arrangement realizes a high emitter-to-ground impedance for the transistor circuit. As a result, the resistance looking into the port defined at the remote end of the isolating capacitor C1 will be negative. Since the active network is very susceptible to oscillations, the biasing resistance R1 and the isolating capacitor C1 are selected to be such that the network does not oscillate. Under these conditions, a selected amount of negative resistance is presented at the junction of the ceramic resonator 60 and the coupling capacitor 62 in each notch filter.

By using the Q-multiplier circuit, in accordance with this invention, the operation of the interference filter can be improved significantly to the point where trap depths exceeding 20 dBs and −3 dB bandwidths smaller than 3 MHz. can be realized. The following is a listing of preferred component values for use with the active network shown in FIG. 7 for realizing the desired trap characteristics.

C1=2 pf
Cf=20 pf
R1=100 k
R2=1.8 k
C2=1 pf
C3=100 pf

Figure 8:
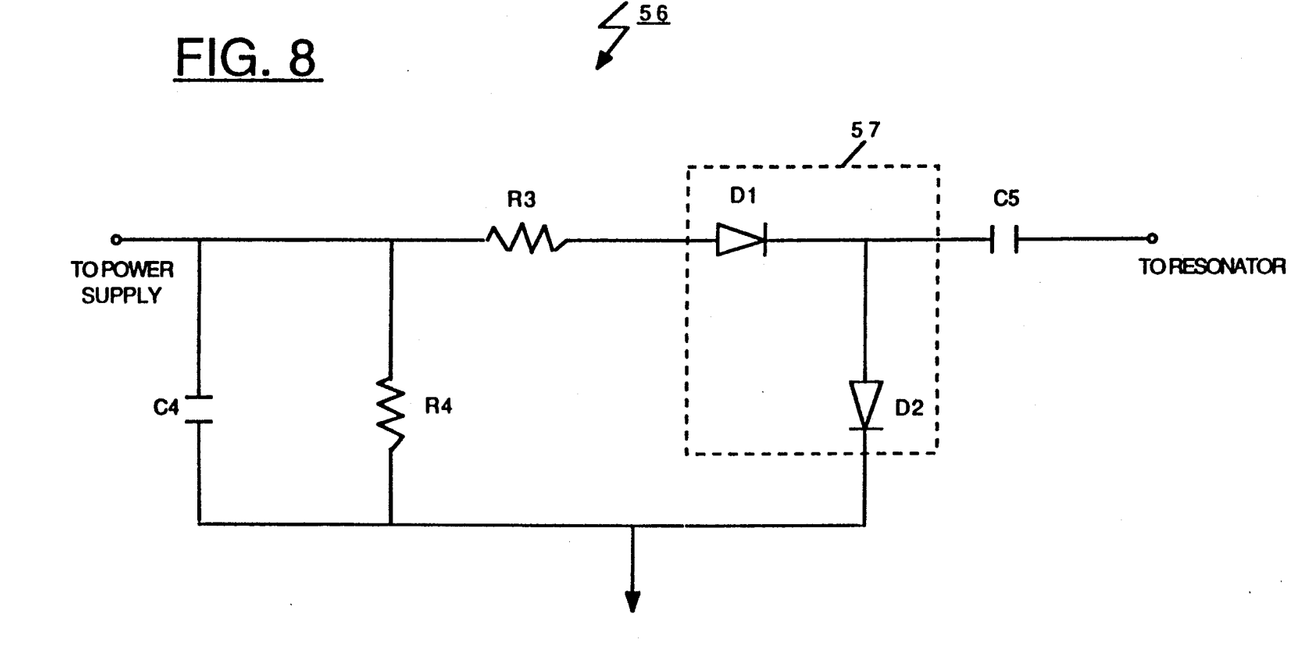
FIG. 8 is a schematic diagram of a preferred switching arrangement for use with the filter of FIG. 4.

Referring now to FIG. 8, there is shown a schematic diagram of a preferred implementation of the switches 56 and 56' for use with the interference filter of FIG. 4. The switch is preferably powered by a 12 volt power supply which is fed through a resistance R3 to a standard pin diode combination 57 which includes a diode D1 connecting the resistance R3 to a blocking capacitor C5, the output of which is connected to the resonator in the associated notch filter. A diode D2 serially connects the diode D1 to the reference ground plane. The input end of the switch 56 is also connected to the reference ground plane through a parallel combination of a capacitance C4 and a resistance R4.

The switch 56 essentially operates by maintaining a forward bias on the pin diode D1 when the power supply to the switch is maintained at a positive level. Under this condition, the pin diode acts as a short circuit. As a result, within the interference filter circuit, the ceramic resonator is bypassed and the corresponding trap frequency is pulled down to a very low frequency level (approximately 300 MHz.). The filter is, thus, effectively switched out of the receiver circuit. When the power supply to the switch 56 is maintained at a negative level, the pin diode D1 is reverse biased, thereby bringing about the complete notching effect of the notch filter.

The following are illustrative component values for implementing the switch circuit 56 according to a preferred embodiment.

Power supply = ±12 volts
C4 = 0.1 μf
C5 = 10 pf
R3 = 1.8 k
R4 = 10 k

As described above, the provision of the Q-multiplier circuits effectively increases the quality factor of the resonance circuits in the interference filter by offering a desired amount of negative resistance thereto. However, the negative conductness provided by the active network is susceptible to temperature fluctuations and decreases with increasing temperature. As a result, any increase in temperature of the overall filter circuit brings about a corresponding decrease in the trap depth and, hence, the efficiency of rejection. A similar action can occur over prolonged circuit operation as a result of component aging.

In accordance with a feature of this invention, the trap characteristics of the interference filter are compensated for temperature drift by provision of a compensating power supply which feeds the Q-multiplier circuit provided in each of the trap sections. The compensating power supply essentially generates an output voltage which increases in direct proportion to the temperature of the circuit.

Figure 9:
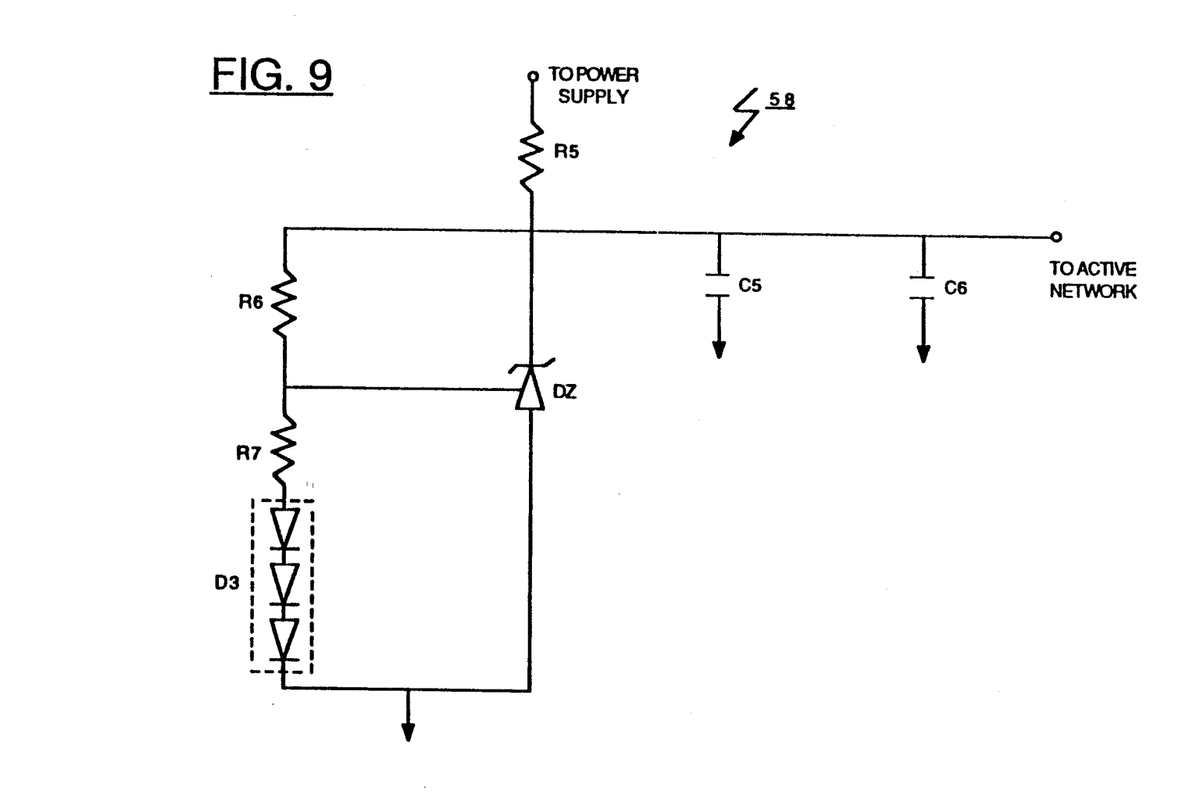
FIG. 9 is a schematic diagram of a preferred compensating power supply for activating the Q-multiplier units of FIG. 4.

More specifically, as shown in the preferred arrangement of FIG. 9, the compensating power supply 58 is fed by a power supply (not shown) through a load resistance R5 which connects to the junction of the anode end of a zener diode DZ and a resistance R6. The resistance R6 is connected to a serial connection of a second resistance R7 and a serially connected pin diode group D3. The anode end of the diode group is connected to the cathode of the zener diode and to the reference ground plane. The zener diode DZ is preferably of the programmable type receiving a control input from the junction of resistances R6 and R7. The output of the compensating power supply is taken from the anode end of the zener diode and is fed to the collector of the transistor T1 in each of the Q-multiplier circuits 54 and 54'. Blocking capacitors C5 and C6 are connected across the output line and the reference ground plane.

The compensating power supply 58 essentially operates by utilizing the zener diode DZ as a voltage-sensitive switch which, in combination with the temperature characteristics of the silicon pin diode group D3, generates an output voltage which is directly proportional to the temperature of operation of the compensating power supply. The net result is that the collector voltage in the active network of the Q-multiplier circuits is consistently increased with increasing temperature so that the negative resistance offered to the resonant circuit is also correspondingly increased. Thus, the high quality factor and high trap depth of the overall interference filter is maintained substantially stable despite temperature fluctuations and component aging factors.

The following are illustrative component values for implementing the compensating power supply 58 according to a preferred embodiment.

C5 = 0.1 μf
C6 = 10 μf
R5 = 270 Ω
R6 = 1.8 k
R7 = 390 Ω

It will be apparent from the foregoing that the improved interference filter of this invention is capable of high sensitivity rejection of interfering high frequency signals and of being easily tuned to adjust the top and bottom rejection frequencies and to optimize the quality factor and trap depth thereof. The filter can be easily adjusted to compensate for variation in frequency stability and trap depth resulting from temperature fluctuation and component aging. Because of its simplicity and minimal component count, the filter is also capable of being manufactured at costs substantially lower than that of conventional interference filters and is particularly adapted for being incorporated as a low-cost, low-bulk TI filter circuit in TVRO tuners.

While the improved interference filter has been described above is particularly suited for use in TI rejection in TVRO receivers, it will be understood that the filter may be used advantageously in various other applications where rejection of spurious outputs and other interfering signals is required with a high degree of sensitivity and selectivity. For instance, the interference filter can be used in TV receivers for trapping undesired FM interference on specific channels and in cable TV for removing interference signals, including those associated with channel lock-out arrangements for pay-to-view programs and the like.

We claim:

1. A TVRO receiver for receiving frequency modulated video signals, the receiver comprising:
   a tuner including a super heterodyne circuit having a voltage-controlled oscillator (VCO), means for supplying a controlling input voltage to said VCO, and a mixer for combining incoming 1st intermediate frequency (II) signals within a first predetermined IF frequency range with the output of said VCO so as to reduce the frequency of the 1st IF signals so as to generate 2nd IF signals within a second predetermined IF frequency range, and
   a filter for selectively blocking out interference signals, said filter comprising,
   first trap means for blocking out interference signals having a selected bottom trap frequency,
   second trap means for blocking out interference signals having a selected top trap frequency, each of said first and second trap means comprising a frequency resonant element, said first and second trap means respectively blocking out signals below said bottom trap frequency and above said top trap frequency with a predefined attenuation level or "trap depth", tuning means for adjusting said bottom and top frequencies of said first and second trap means, an active negative resistance network for offering a negative resistance to said resonant element in said trap means for varying the trap depth thereof, so as to increase the selectivity with which said interference signals are rejected, and compensating means for adjusting the negative resistance offered by said active network so as to controllably counteract any variation due to temperature of said negative resistance and, hence, said trap depth and selectivity of said first and second trap means.

2. The TVRO receiver of claim 1 further including means for selectively switching said first and second trap means into and out of said receiver.

3. The TVRO receiver according to claim 1 wherein separate tuning means are provided for each of said first and second trap means, each tuning means comprising a variable capacitance element which is connected in parallel with a serial connection of said frequency resonant element with a capacitive coupling element.

4. The TVRO receiver of claim 3 wherein said resonant element is a ceramic resonator.

5. In a receiver comprising a tuner including a super heterodyne having a voltage-controlled oscillator (VCO), means for supplying a controlling input voltage to said VCO, and a mixer for combining incoming 1st intermediate frequency (IF) signals within a first predetermined IF frequency range with the output of said VCO to reduce the frequency of the 1st IF signals so as to generate 2nd IF signals within a second predetermined IF frequency range, the improvement comprising a filter for selective rejection of interference signals and the like, said filter comprising:

first and second trap means for selectively rejecting signals respectively centered about selected top and bottom trap frequencies in accordance with a set attenuation level, each of said first and second trap means comprising a frequency resonant element, said first and second trap means respectively blocking out interfering signals with a predefined attenuation level or "trap depth", tuning means for adjusting said top and bottom frequencies of said trap means, an active negative resistance network for offering a negative resistance to said resonant element in said trap means for varying the trap depth thereof, so as to increase the selectivity with which said interference signals as rejected;

and compensating means for adjusting the negative resistance offered by said active network so as to controllably counteract any variation due to temperature of said negative resistance and, hence, said trap depth and selectivity of said first and second trap means, 6. The improved receiver of claim 5 further including means for selectively switching said first and second trap means into and out of said receiver.

7. The receiver according to claim 5 wherein separate tuning means are provided for each of said first and second trap means, each tuning means comprising a variable capacitance element which is connected in parallel with a series connection of said frequency resonant element with a capacitive coupling element.

8. The receiver of claim 7 wherein said resonant element is a ceramic resonator.

* * * * *